April 14, 1931.  R. SCHROEDER  1,800,360
PROCESS OF MANUFACTURING TUBULAR PARTS
Original Filed Feb. 25, 1927
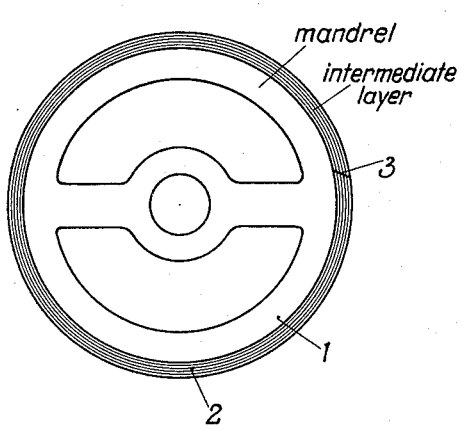
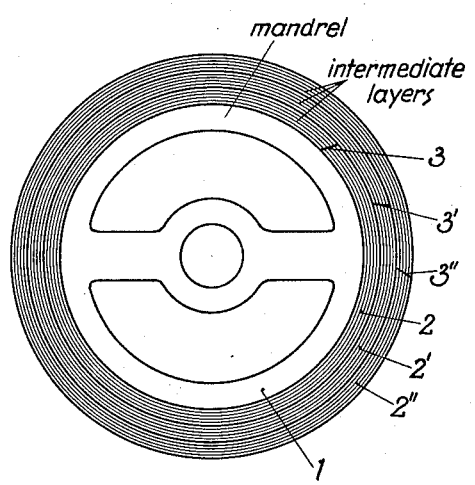
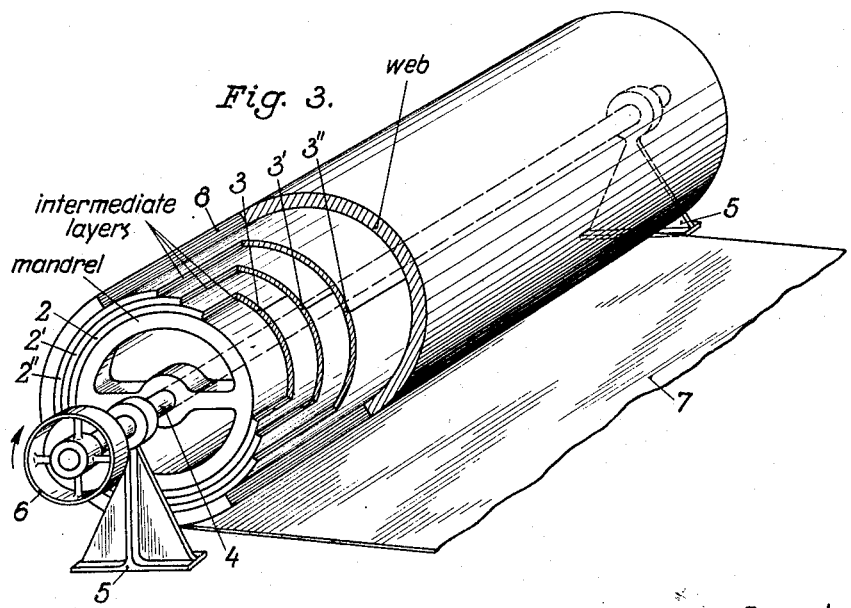
Inventor:
Richard Schroeder Patented Apr. 14, 1931

1,800,360

UNITED STATES PATENT OFFICE

RICHARD SCHROEDER, OF BERLIN, GERMANY

PROCESS OF MANUFACTURING TUBULAR PARTS

Original application filed February 25, 1927, Serial No. 170,931, and in Germany March 5, 1926. Divided and this application filed January 19, 1929. Serial No. 333,746.

My invention relates to a process of manufacturing tubular parts such as described in my application Ser. No. 170,931 filed February 25, 1927, of which this is a division, in which the tubular part is formed by winding a web on a mandrel, an intermediate layer being inserted between the mandrel and the tube for the purpose of utilizing a single mandrel for various sizes of tubes, the clearance between the inner diameter of the tube and the outer diameter of the mandrel being made up by the intermediate layer.

It is an object of my invention to improve this process and to this end, instead of the usual undivided layer, I provide a longitudinally divided layer which is more readily withdrawn from the finished tube than an undivided layer.

My invention removes the drawback inherent in undivided intermediate layers that they are difficult to remove from the finished tube and, on being removed, are damaged to an extent which renders them unsuitable for further use. On the other hand by dividing the intermediate layer according to my invention, I endow it with the resiliency required for readily removing it from the finished tube without damage to the layer or to the tube.

In reducing my invention to practice I provide a single layer of suitable web material which is divided in a radial plane or in a plane extending at an angle to its radius. It is very important that the joint at the line of division should be absolutely tight as otherwise a ridge will form on the inside of the tubes.

Instead of a single layer I may provide any number of superimposed layers. Preferably the lines along which the layers are divided, are staggered in the several layers.

Any suitable material may be used for the layers according to my invention, for instance sheet metal or vulcanized fibre, but I prefer to make them of fibrous web material which is impregnated with a suitable sizing; for instance I may form a tubular cylinder by winding a web or webs of impregnated paper or fabric on a suitable mandrel and connecting the superimposed thicknesses of the web, and divide the cylinder while on the mandrel or after the mandrel has been extracted.

For impregnating the webs, I may use any suitable sizing, for instance a natural or artificial resin. Such resin may be artificial resin adapted to be hardened, and preferably a condensation product of phenol or its derivatives, and formaldehyde or its polymers as bakelite; in such case I prefer to bake the cylinder until the artificial resin has attained the desired degree of hardness.

For instance, in order to construct a layer, a web of paper impregnated with a condensation product of phenol and formaldehyde is wound around the mandrel under pressure exerted by a heated roller to form a laminated cylinder, the thicknesses of the web being connected by the artificial resin. The cylinder is then placed in an oven while still on the mandrel and is baked until the condensation product has attained the desired degree of hardness, and then the baked cylinder is longitudinally divided.

My invention involves the important advantage that a comparatively small stock of mandrels is required which is a great saving as such mandrels must be machined with great exactness and are therefore expensive, particularly when large mandrels are required. The waste of material is also greatly reduced because the intermediate layers may be used over and over again. For instance, the diameters of the mandrels in stock may vary within the limits of $\frac{3}{4}$ to $1\frac{1}{2}$ in. and the clearance between the outer diameter of a given mandrel and the inner diameter of the tubes to be made on the mandrel is made up by intermediate layers which may be $\frac{1}{16}$ to $\frac{3}{16}$ in. thick, such intermediate layers being superimposed with their lines of division staggered, until the outer diameter of the mandrel plus the total thickness of the intermediate layers is equal to the required inner diameter of the tube. The tube, which may be an insulating cylinder for electrical equipment or machinery, for instance transformers, and may be made of any suitable material, such as paper impregnated with artificial resin adapted to be hardened, particularly a condensation product of phenol and formaldehyde, for instance bakelite, is wound about the intermediate layer under pressure exerted by a heated roller, if desired. The finished tubes or cylinders are then placed in an oven, while still on the mandrel, and are baked until the bakelite has attained the required degree of hardness, and finally the mandrel and the layer or layers are extracted in succession. As soon as the mandrel has been extracted pressure is no longer exerted on the layer or layers so that they can be removed from the finished tube or cylinder without undergoing damage or damaging the tube. The life of the layers is practically unlimited.

On the annexed drawing on which I have shown my invention by way of illustration, Fig. 1 is an end view of the mandrel having placed thereon an intermediate layer.

Fig. 2, a similar view as Fig. 1, showing a mandrel having placed thereon three intermediate layers, one superimposed on the other.

Fig. 3 shows, on a smaller scale, a mandrel having placed thereon three intermediate layers, surrounded by a web, portions of the layers and the web being shown removed for the sake of showing the arrangement.

The mandrel, which may be made of cast iron, is indicated at 1. At 2, $2^1$ and $2^{11}$ are shown the intermediate cylindrical layers in superposed relation. As shown, at 3, $3^1$ and $3^{11}$ each of these layers is provided with a slit extending parallel to the axis of the cylinder. As clearly shown in Figs. 1 and 2, the edges of said slits are closely abutting each other, and when several intermediate layers are used, the said slits as shown in Figs. 2 and 3, are in offset or staggered relation.

The mandrel is mounted on a shaft 4 journalled in bearings 5 and carrying a pulley 6 whereby the mandrel can be rotated in the direction of the arrow shown in Fig. 3.

After the intermediate layers have been placed on the mandrel, a web 7 of paper impregnated with artificial resin, or other suitable material, is wound around the said layers, the said web forming a cylinder 8. The web being tightly wound around the intermediate layers presses the same against the mandrel so that they will rotate therewith and at the same time, the edges of the slits 3, $3^1$ and $3^{11}$ are so closely pressed against each other that no rib will be formed on the cylinder 8.

After the latter has reached the desired thickness, the shaft 4 is pulled out, and the mandrel together with intermediate layer or layers and the cylinder 8 is placed in an oven and heated therein, until the artificial resin contained in the said cylinder has reached the desired degreed of hardness. Thereupon, first the mandrel 1 and then the intermediate layer or layers are pulled out.

It is understood that I am not limited to the manufacture of cylindrical tubes or cylindrical mandrels, but that my process may be applied to the manufacture of tubes and other hollow parts of any cross-section (square, rectangular, elliptical, etc.) without departing from my invention.

I wish it to be understood that I do not desire to be limited to the exact details of construction shown and described since obvious modifications will occur to a person skilled in the art.

In the claims affixed to this specification no selection of any particular modification of the invention is intended to the exclusion of other modifications thereof, and the right to subsequently make claim to any modification not covered by these claims is expressly reserved.

I claim:

1. The process of manufacturing tubular parts by winding a web of any suitable material around a mandrel and inserting an intermediate layer between said mandrel and said material, comprising the step of employing a longitudinally divided intermediate layer, with its dividing edges closely abutting.

2. The process of manufacturing tubular parts by winding a web of any suitable material around a mandrel and inserting an intermediate layer between said mandrel and said material, comprising the step of employing a plurality of longitudinally divided intermediate layers with their dividing edges closely abutting.

3. The process of manufacturing tubular parts by winding a web of any suitable material around a mandrel and inserting an intermediate layer between said mandrel and said material, comprising the steps of employing a plurality of longitudinally divided intermediate layers with their dividing edges closely abutting and arranging said layers with their dividing edges in staggered relation.

4. The process of manufacturing tubular parts by winding a web of any suitable material around a mandrel and inserting an intermediate layer between said mandrel and said material, comprising the steps of employing a longitudinally divided intermediate layer with its dividing edges closely abutting, and successively extracting said mandrel and said layer from the finished part.

5. The process of manufacturing tubular parts by winding a web of any suitable material around a mandrel, connecting the superimposed thicknesses of the web into a cylinder, dividing said cylinder, winding a web on said divided cylinder, connecting the thicknesses of said last-mentioned web into an outer tube or cylinder, and extracting from said cylinder said mandrel and said first-mentioned cylinder in succession.

In testimony whereof, I affix my signature.

RICHARD SCHROEDER.